2,756,152
METHOD OF MAKING FRUIT PIE

Monroe Boston Strause, San Diego, Calif.

No Drawing. Application January 15, 1952,
Serial No. 266,597

4 Claims. (Cl. 99—92)

This invention relates to the method of making pie and has particularly to do with the method of making apple pie from dried apples or so-called "processed" apples which are treated to remove water to permit shipping and storage and which are subsequently soaked in water to replace the moisture content.

It is an object of the invention to provide an apple pie made from processed apples which is comparable to or better than a pie made from fresh apples, and which pie is made by a method which results in economies in the preparation and baking.

Attention is called to a patent to Kaser, No. 1,624,490, dated April 12, 1927, wherein is disclosed a method of making pies. In this identified patent one of the main features of the process or method is the removing of juice from the filler prior to the baking and subsequently reintroducing the juice.

With the present invention, while this step is one of the steps of the method, there are other important steps in the process which distinguish it and which have a definite effect on the resulting product.

In the first place, with respect to the apples, the moisture content of the dried apples must be from 5% to 22%. In previous cases it has been thought necessary to reduce the moisture of these apples to 1% to 2%, but it has been shown that an apple with this much moisture removed has a tendency to toughen to the point that moisture cannot be reinserted to tenderize the fruit.

An important discovery which forms a part of the process to be described is that when apples are cooked in a pie together with sugar, the sugar seems to form a film around the fruit and prevents it from cooking evenly and leaves the fruit in a tough condition which usually identifies it as dried fruit.

In the present method the apples are soaked for 8 hours or overnight in the proportion of about 1 pound of apples to 10 pounds of water. When the apples have soaked for the proper length of time, they should be drained, but not pressed, and the water should be saved for the juice mix.

The apples are then ready to place in the pies and should be used at onec, and they should not be drained until ready for use. The apples are placed in the pies and pyramided slightly to the center, but they should not be pressed or packed in.

The cover crust is added, leaving a small hole in the center and preferably sealing the edges well. As the pies come from the oven the hot juice mixture should be added, and this will be now described.

The proper amount of juice to add to each pie is from ¾ of an ounce to 1 ounce of juice to each ounce of soaked apples used in the pie. All of the juice is added to the pies as they come from the oven.

Assuming that 15 pounds of water is to be used, the drain water from the apples must be taken and any remaining water added from the faucet.

The aditional ingredients are:

1½ ounces salt
5 pounds sugar
¾ ounce cinnamon
½ ounce fresh lemon juice

The above ingredients are thickened with 6 ounces of starch dissolved in water. The mixture is cooked to a point where it is thick and clear.

After the pies are removed from the oven as above indicated, assuming that 18 ounces of soaked apples are used in a 9 inch piece, a total of 16 to 18 ounces of juice would be added as the pies come from the oven.

It will be seen that it is very advantageous to use dried apples for making commercial pies since the great cost of handling apples and peeling them is eliminated, and furthermore more uniform pies may be obtained over a longer period of time.

In addition, due to the fact that fresh apples cook down considerably, it is necessary to pyramide them higher than would be necessary with the dried apples.

The only caution with respect to the dried apples is that they be not packed in since this prevents the circulation of heat and gives an uneven cooking.

Another advantage in the use of dried apples is that a pie using them may be baked in about thirty minutes. A fresh apple pie take forty-five minutes and a lower temperature to keep it from burning.

It has been found that apples when dried must be reasonably mature. If they are packed when they are too green the acid and starch is not turned to sugar naturally. If they are packed when fairly ripe they have a high sugar content in themselves and may be soaked and cooked without sugar.

What I claim is:

1. The method of making apple pies from dried apples which comprises soaking and draining the apples, introducing them into a crust pie and cooking in the absence of sugar and juice, preparing a juice utilizing the water drained from the soaked apples together with sugar and a thickening agent and spice flavoring, cooking the thus prepared juice mixture to the consistency of a thick, clear syrup, introducing the cooked syrup in approximately even weight with the dried apples, all of the syrup being introduced immediately when the pie is removed from the oven.

2. The method of making apple pies which comprises selecting dried apples having a moisture content of from 5 to 22 per cent, soaking and draining the apples, introducing them into a crust pie and cooking in the absence of sugar and juice, preparing a juice utilizing the water drained from the soaked apples together with sugar and a thickening agent and spice flavoring, cooking the thus prepared juice mixture to the consistency of a thick, clear syrup, introducing the cooked syrup in approximately even weight with the dried apples, all of the syrup being introduced immediated when the pie is removed from the oven.

3. The method of making apple pies from dried apples which comprises selecting relatively mature apples, drying the same to have a moisture content of from 5 to 22 per cent, soaking the apples at least eight hours in the proportion of approximately one pound of apples to ten pounds of water, draining the apples and introducing them into a crust pie, baking the pie in an oven, preparing a juice, utilizing the water from the soaking apples together with sugar, a thickening agent and spice flavoring, cooking the thus prepared juice mixture to the consistency of a thick, clear syrup, and introducing the cooked syrup in approximately even weight with the drained apples, all of the syrup being introduced immediately when the pie is removed from the oven.

4. The method of making apple pies from dried apples which comprises selecting dried apples from which moisture has been removed to not less than 5 per cent, soaking the apples for a period of eight hours, draining the apples, introducing them into a crust pie without pressing and packing, baking the pie, preparing a thickened juice utilizing the water drained from the soaked apples together with a sweetening agent and flavoring, cooking the thus prepared juice mixture to the consistency of a thick, clear syrup, and introducing into the pie the cooked syrup in an amount approximating from three-fourths to even weight with the drained apples as soon as the pie is removed from the oven.

References Cited in the file of this patent

UNITED STATES PATENTS

| 1,586,893 | Gay et al. | June 1, 1926 |
| 1,624,490 | Kaser | Apr. 12, 1927 |
| 2,451,313 | Arengo-Jones | Oct. 12, 1948 |

OTHER REFERENCES

"Everybody's Cookbook" by Lord, revised edition, Harcourt, Brace and Company, New York, page 591.